United States Patent
Stekkelpak et al.

(10) Patent No.: US 9,837,076 B1
(45) Date of Patent: Dec. 5, 2017

(54) CUSTOMIZING ACTIONS BASED ON CONTEXTUAL DATA AND VOICE-BASED INPUTS

(71) Applicant: Google Inc., Mountain View, CA (US)

(72) Inventors: Zoltan Stekkelpak, Sunnyvale, CA (US); Gyula Simonyi, Dublin (IE)

(73) Assignee: Google Inc., Mountain View, CA (US)

( * ) Notice: Subject to any disclaimer, the term of this patent is extended or adjusted under 35 U.S.C. 154(b) by 41 days.

(21) Appl. No.: 14/975,479

(22) Filed: Dec. 18, 2015

Related U.S. Application Data

(63) Continuation of application No. 13/783,145, filed on Mar. 1, 2013, now Pat. No. 9,218,819.

(51) Int. Cl.
  *G10L 21/00* (2013.01)
  *G10L 15/22* (2006.01)
  *G10L 15/18* (2013.01)
  *G10L 15/07* (2013.01)
  *G10L 25/00* (2013.01)

(52) U.S. Cl.
  CPC .............. *G10L 15/22* (2013.01); *G10L 15/07* (2013.01); *G10L 15/1815* (2013.01); *G10L 2015/223* (2013.01)

(58) Field of Classification Search
  CPC ..... G10L 15/22; G10L 15/07; G10L 15/1815; G10L 2015/223
  USPC .......................... 704/206, 250, 255, 266, 275
  See application file for complete search history.

(56) References Cited

U.S. PATENT DOCUMENTS

| | | | |
|---|---|---|---|
| 5,666,502 | A | 9/1997 | Capps |
| 5,946,647 | A | 8/1999 | Miller et al. |
| 6,513,036 | B2 | 1/2003 | Fruensgaard et al. |
| 6,832,218 | B1 | 12/2004 | Emens et al. |
| 6,847,959 | B1 | 1/2005 | Arrouye et al. |
| 6,944,612 | B2 | 9/2005 | Roustant et al. |
| 7,562,076 | B2 | 7/2009 | Kapur |
| 7,565,139 | B2 | 7/2009 | Neven, Sr. et al. |
| 7,614,008 | B2 | 11/2009 | Ording |

(Continued)

FOREIGN PATENT DOCUMENTS

| | | |
|---|---|---|
| CN | 101341464 | 1/2009 |
| CN | 102298616 | 12/2011 |

(Continued)

OTHER PUBLICATIONS

Tripit, "TripIt Simplifies Business Travel and Keeps Travelers Connected on the Road," Concur Technologies Inc., Feb. 4, 2008, available at http://www.tripit.com/press/companyannouncements/tripit-simplifies-business-travel-and-keeps-travelers-connected-road, pp. 1-2.

(Continued)

*Primary Examiner* — Thierry L Pham
(74) *Attorney, Agent, or Firm* — Fish & Richardson P.C.

(57) ABSTRACT

Methods and systems are provided for customizing an action. In some implementations, voice input is received from a user and a context is determined from the voice input. Potential contextual data is identified based on the context and the voice input. A level of confidence is determined for an association of the potential contextual data and the context. An action is performed based on the voice input, the potential contextual data, and the level of confidence. The potential contextual data is used to customize the action.

20 Claims, 8 Drawing Sheets

(56) References Cited

U.S. PATENT DOCUMENTS

| | | |
|---|---|---|
| 7,720,702 B2 | 5/2010 | Fredericks et al. |
| 7,761,414 B2 | 7/2010 | Freedman |
| 7,818,324 B1 | 10/2010 | Held et al. |
| 7,895,196 B2 | 2/2011 | Mahadevan et al. |
| 7,933,900 B2 | 4/2011 | Reddy et al. |
| 7,956,847 B2 | 6/2011 | Christie |
| 7,974,892 B2 | 7/2011 | Fredericks et al. |
| 8,005,720 B2 | 8/2011 | King et al. |
| 8,086,604 B2 | 12/2011 | Arrouye et al. |
| 8,140,361 B2 | 3/2012 | Fredericks et al. |
| 8,286,885 B1 | 10/2012 | Zehr et al. |
| 8,316,029 B2 | 11/2012 | Lawrence |
| 8,429,103 B1 | 4/2013 | Aradhye et al. |
| 2002/0083038 A1 | 6/2002 | Berndt |
| 2002/0083039 A1 | 6/2002 | Ferrari et al. |
| 2002/0160772 A1 | 10/2002 | Gailey et al. |
| 2004/0093321 A1 | 5/2004 | Roustant et al. |
| 2006/0026147 A1 | 2/2006 | Cone et al. |
| 2006/0097991 A1 | 5/2006 | Hotelling et al. |
| 2006/0271368 A1 | 11/2006 | Carmiel et al. |
| 2007/0055947 A1 | 3/2007 | Ostojic et al. |
| 2007/0260594 A1 | 11/2007 | Lewak et al. |
| 2008/0010273 A1 | 1/2008 | Frank |
| 2008/0126143 A1 | 5/2008 | Altman et al. |
| 2009/0058821 A1 | 3/2009 | Chaudhri et al. |
| 2009/0167704 A1 | 7/2009 | Terlizzi et al. |
| 2009/0224867 A1 | 9/2009 | O'Shaughnessy et al. |
| 2010/0070448 A1 | 3/2010 | Omoigui |
| 2010/0286979 A1 | 11/2010 | Zangvil et al. |
| 2010/0312547 A1* | 12/2010 | Van Os .................. G06F 3/167 704/9 |
| 2011/0137883 A1 | 6/2011 | Lagad et al. |
| 2011/0184981 A1 | 7/2011 | Lu et al. |
| 2011/0202493 A1 | 8/2011 | Li |
| 2011/0258006 A1 | 10/2011 | Koetting et al. |
| 2012/0059745 A1 | 3/2012 | Fredericks et al. |
| 2012/0066627 A1 | 3/2012 | Furukawa et al. |
| 2012/0101858 A1 | 4/2012 | Depasquale et al. |
| 2012/0101901 A1 | 4/2012 | Depasquale et al. |
| 2012/0150572 A1 | 6/2012 | Fredericks et al. |
| 2012/0159340 A1 | 6/2012 | Bae et al. |
| 2012/0246153 A1 | 9/2012 | Pe hie |
| 2012/0330906 A1 | 12/2012 | Fredericks et al. |
| 2013/0054542 A1 | 2/2013 | Ollenberger et al. |
| 2013/0110833 A1 | 5/2013 | Fredericks et al. |
| 2013/0246050 A1* | 9/2013 | Yu .................. G10L 15/1822 704/9 |
| 2014/0074958 A1 | 3/2014 | Elliott et al. |

FOREIGN PATENT DOCUMENTS

| | | |
|---|---|---|
| JP | 2005165986 | 6/2005 |
| JP | 2011186876 | 9/2011 |
| WO | 0131479 | 5/2001 |
| WO | 2006110480 | 10/2006 |
| WO | 2010120925 | 10/2010 |

OTHER PUBLICATIONS

TripIt, "TripIt Brings Travel Itineraries to Mobile Phones," Concur Technologies Inc., Apr. 7, 2008, available at http://www.tripit.com/press/company-announcements/tripitbrings-travel-itineraries-mobile-phones, pp. 1-2.

Tripit, "Announcing Trip It—The First Intelligent Travel Organizer for Do-It-Yourself Trip Planners," Concur Technologies Inc., Sep. 18, 2007, available at http://www.tripit.com/press/company-announcements/announcing-tripit-first-intelligenttravel-organizer-do-it-yourself-trip, pp. 1-2.

Marie-Catherine De Marneffe, Christopher D. Manning, "Stanford Typed Dependencies Manual," Sep. 2011, 24 pages.

Kao, Wayne, "Telling the Story of Friendships," Facebook, Oct. 28, 2010, available at http://blog.facebook.com/blog.php-?post=443390892130, pp. 1-2.

Dekang Lin, "Dependency-based Evaluation of MINIPAR," In Workshop on the Evaluation of Parsing Systems, May 1, 1998, 14 pages, Granada, Spain.

Rion Snow, Daniel Jurafsky, Andrew Y. Ng, "Learning Syntactic Patterns for Automatic Hypernym Discovery," 2011, 8 pages.

Veselin Stoyanov, Claire Gardie, Nathan Gilbert, Ellen Riloff, David Buttler, David Hysom, "Reconcile: A Coreference Resolution Research Platform," May 13, 2010, 14 pages.

Brent W. Hopkins, "Dolphin Browser HD," Washington Post, Aug. 8, 2010, 2 pages.

Ty McMahan, "Sequioa Leads $10M Series A for Mobile Browser Co. Mobotap," Press Release—Dow Jones Venture Wire, Jul. 18, 2011, Dow Jones Financial Information Services, 1 page.

Patanaik, Amaiya, "Open Domain Factoid Question Answering System," Thesis, Indian Institute of Technology—Kharagpur, Department of Electrical Engineering, May 2009, 48 pages.

* cited by examiner

CUSTOMIZING ACTIONS BASED ON CONTEXTUAL DATA AND VOICE-BASED INPUTS

CROSS-REFERENCE TO RELATED APPLICATION

This is a continuation of U.S. application Ser. No. 13/783,145, filed on Mar. 1, 2013, the disclosure of which is considered part of and is incorporated by reference in the disclosure of this application.

BACKGROUND

This disclosure generally relates to customizing an action in response to a user input. User input in the form of a voice command is processed by mobile devices. An action is performed by the mobile devices based on the information explicit in the voice command.

SUMMARY

In some implementations, a system receives a user input, which may include a voice-based query or command, and processes it to determine a context for the user input. The system identifies potential contextual data based on the identified context. The system uses the potential contextual data to customize a response to the user input.

In some implementations, a computer-implemented method includes receiving a voice input from a user and determining a context from the voice input. The method includes identifying potential contextual data based on the context and the voice input, wherein the potential contextual data comprises previously stored data specific to the user. The method includes determining a level of confidence for an association of the potential contextual data and the context. The method includes performing an action based on the voice input, on the potential contextual data, and on the level of confidence, wherein the potential contextual data are used to customize the action.

These and other implementations can each include one or more of the following features. In some implementations, performing the action comprises presenting a refining prompt when the level of confidence is sufficiently low. In some implementations, the voice input comprises a command and wherein performing the action comprises performing an action in response to the command that is customized based on the potential contextual data when the level of confidence is sufficiently high. In some implementations, the potential contextual data are selected from the group consisting of calendar data associated with the user, social network data associated with the user, email data associated with the user, text message data associated with the user, telephone conversation data associated with the user, internet activity data associated with the user, and any combination thereof. In some implementations, identifying potential contextual data comprises building an event model by identifying current and near term events related to the user, wherein the event model comprises data indicative of people, places, and times associated with the events, and identifying data from the event model that is potentially associated with the context. In some implementations, the method further comprises processing the voice input and the context to determine whether there is sufficient information to perform an action and determining one or more missing parameters from the voice input when there is not sufficient information, wherein identifying potential contextual data comprises identifying potential contextual data based on the one or more missing parameters, the context, and the voice input, and wherein the potential contextual data comprises previously stored data specific to the user. In some implementations, performing an action comprises performing an action based on the voice input, on the potential contextual data, and on the confidence level, wherein the potential contextual data are used to supplement the voice input. In some implementations, performing an action comprises ranking the one or more missing parameters and presenting a query to refine the voice input based on the ranking when the level of confidence is sufficiently low. In some implementations, the method further comprises accessing data associated with other users and identifying data that are potentially associated with the one or more missing parameters. In some implementations, identifying potential contextual data further comprises identifying trend in user data associated with the user over time and determining information indicative of the one or more missing parameters based on the trends. In some implementations, the method further comprises presenting options for the missing information to the user in order to allow the user to select one or more of the options.

In some implementations, a system includes one or more computers configured to perform operations. The operations include receiving a voice input from a user and determining a context from the voice input. The operations include identifying potential contextual data based on the context and the voice input, wherein the potential contextual data comprises previously stored data specific to the user. The operations include determining a level of confidence for an association of the potential contextual data and the context. The operations include performing an action based on the voice input, on the potential contextual data, and on the level of confidence, wherein the potential contextual data are used to customize the action.

These and other implementations can each include one or more of the following features. In some implementations, performing the action comprises presenting a refining prompt when the level of confidence is sufficiently low. In some implementations, the voice input comprises a command and wherein performing the action comprises performing an action in response to the command that is customized based on the potential contextual data when the level of confidence is sufficiently high. In some implementations, the potential contextual data are selected from the group consisting of calendar data associated with the user, social network data associated with the user, email data associated with the user, text message data associated with the user, telephone conversation data associated with the user, internet activity data associated with the user, and any combination thereof. In some implementations, identifying potential contextual data comprises building an event model by identifying current and near term events related to the user, wherein the event model comprises data indicative of people, places, and times associated with the events, and identifying data from the event model that is potentially associated with the context. In some implementations, the system further comprises processing the voice input and the context to determine whether there is sufficient information to perform an action and determining one or more missing parameters from the voice input when there is not sufficient information, wherein identifying potential contextual data comprises identifying potential contextual data based on the one or more missing parameters, the context, and the voice input, and wherein the potential contextual data comprises previously stored data specific to the user. In some implementations, performing an action comprises performing an action based on the voice input, on the potential contextual data, and on the confidence level, wherein the potential contextual data are used to supplement the voice input. In some implementations, performing an action comprises ranking the one or more missing parameters and presenting a query to refine the voice input based on the ranking when the level of confidence is sufficiently low. In some implementations, the system further comprises accessing data associated with other users and identifying data that are potentially associated with the one or more missing parameters. In some implementations, identifying potential contextual data further comprises identifying trend in user data associated with the user over time and determining information indicative of the one or more missing parameters based on the trends. In some implementations, the system further comprises presenting options for the missing information to the user in order to allow the user selection of one or more of the options.

DETAILED DESCRIPTION OF THE FIGURES

Figure 1:
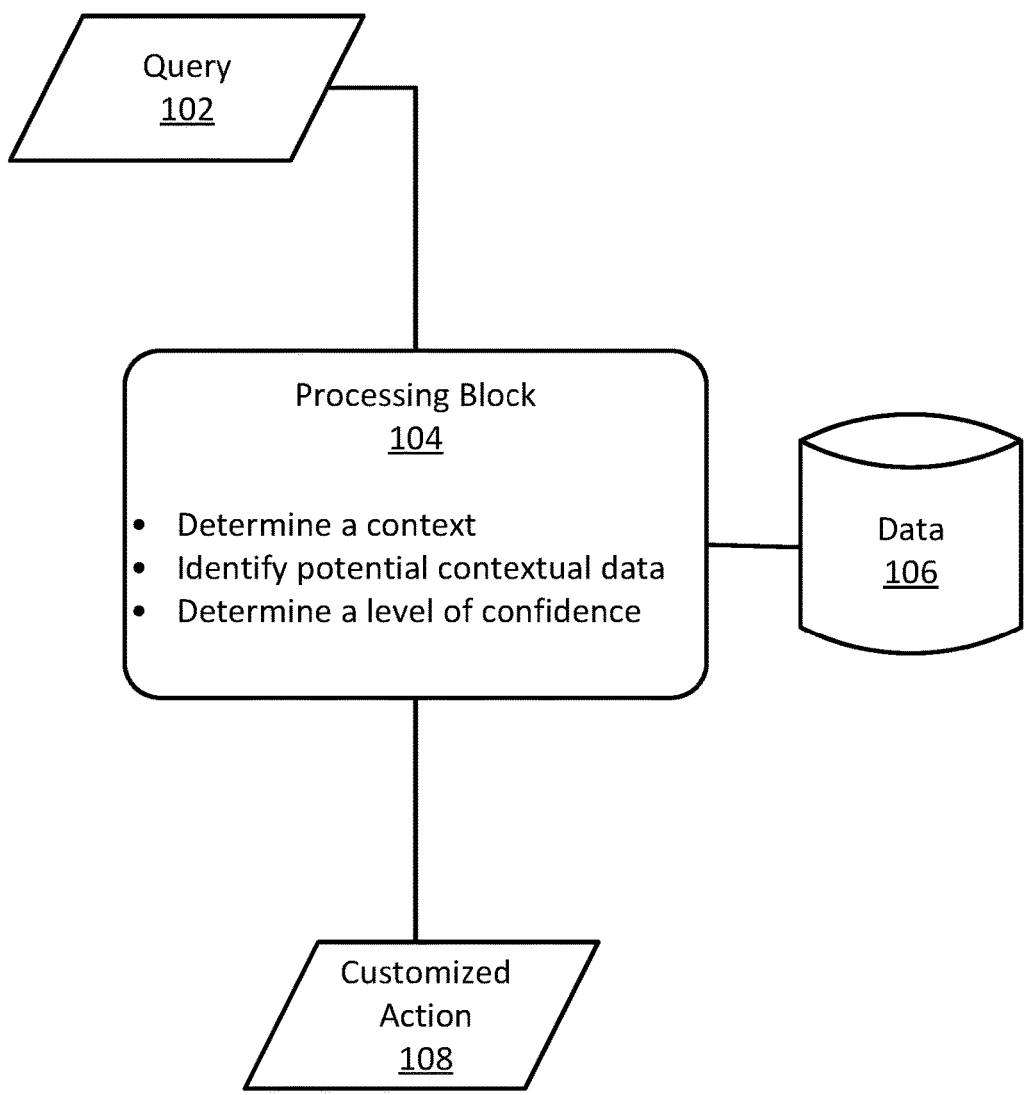
FIG. 1 is a high level block diagram of a system for customizing an action in accordance with some implementations of the present disclosure.

FIG. 1 is a high level block diagram of a system for customizing an action in accordance with some implementations of the present disclosure. In some implementations, the system receives a query and customizes a response based on the context of the query. As used herein, the term query shall refer to any user input that is intended to result in an action being performed by the system based at least on the content of the user input, including, for example, a request for information, a command, any other suitable such input, or any combination thereof. For purposes of brevity and clarity, and not by way of limitation, the present disclosure is presented with respect to the queries being voice inputs. It will be understood that any suitable types of queries, or combinations thereof, may be used in the context of the present disclosure, including, for example, mouse or other pointer-based inputs, keystroke inputs, touch-sensitive device inputs, any other sensor-based input, or any combination thereof.

Context, as used herein, refers to a subject of a query, the subject having data, actions, or both associated therewith. For example, the context of a query related to a trip is the travel context. A context may be either general or specific. For example, a business trip to Asia may be a specific context, while travel may be a general context. Regardless of whether it is specific or general, each context may be defined separately and have its own associated data, actions, or both. The data and actions associated with a particular context, and which may be specific to a user inputting the query, are referred to herein as contextual data.

Contextual data may include any suitable data, any suitable actions, or both, that are associated with a context. The contextual data may be associated with more than one context. Contextual data may be stored remotely or locally, relevant to a user device. Contextual data may be associated with any one or more particular users. For example, in one suitable approach, contextual data may be specific to the user inputting the query. In another suitable approach, contextual data may be specific to the user inputting the query as well as to users with whom that user has a defined relationship according to, for example, a social graph. The contextual data may include user data associated with a context, such as calendar events, telephone conversations, instant messages, emails, purchase history and tracking information, and internet browsing history. In an example, for the query [Upgrade to business class for trip to Asia tonight], the context might be [travel for business trip to Asia]. The system may identify an email booking confirmation for a coach seat on a flight from San Francisco International Airport to Narita International Airport and the action of checking in at the San Francisco International Airport on a social graph website as potential contextual data points. In another example, for the query [Place an order for delivery for a large pepperoni pizza], the context might be [food delivery]. The system may identify a calendar entry indicating the user is presently [out of office], which may indicate that the user intends for the food to be delivered to his home or another location.

The system uses the determined context of the query to identify potential contextual data. Potential contextual data, as used herein, refer to contextual data that the system identifies as relevant to the context of the query. Potential contextual data may be associated with a single relevant user, for example, the user inputting the query, or associated with one or more other users in a database. Potential contextual data may include user data. User data, as used herein, refer to any suitable user-specific data that are stored either remotely or locally, relative to a user device, and that can be referenced by the system. For example, user data may include calendar events, telephone conversations, instant messages, emails, internet browsing history, and other suitable data points. In an example, for the query [Make dinner reservations for Friday], the system may identify a bookmarked web page advertising a special for dinner and drinks at a local restaurant on Friday evening. User data may include user social data, such as social graph data or data indicative of a relationship between the user and others, as well as information regarding the user's interests and preferences. In the dinner reservation example above, potential contextual data might include a data entry in the user's calendar indicating [Dinner with John] on Friday. The system determines a confidence level for the match between the identified potential contextual data and context of the query. If the system assigns the match a high enough confidence level, the associated potential contextual data are used to customize the system's response to the query.

In some implementations, the system detects ambiguities in a query. The system receives a query and processes it to determine the context and what necessary parameters are missing parameters. Missing parameters, as used herein, refer to one or more absent or ambiguous parameters in a query, which must be filled or disambiguated in order for the system to respond to the query. In the above example, missing parameters for the dinner reservation would include the number of people attending the dinner and the restaurant at which the reservation is desired. In some implementations, the system determines which, if any, necessary parameters are missing parameters by comparing the received query with predetermined, necessary parameters that are associated with the context of the received query, a category of the context, or both. A category of the context, as used herein, refers to a class or division of contexts with at least one shared attribute or characteristic. In an example, for the context of car rentals, a category of the context may be [reservations and bookings] or [travel plans]. The system may identify predetermined, necessary parameters using any suitable data structure that stores data indicative of what information is required to perform an action. If the system determines that the query does not provide one or more of the predetermined, necessary parameters, it will determine that these one or more predetermined, necessary parameters are missing parameters. In an example, for the received query [Book me a rental car with AVIS on Market Street in Philadelphia], the system may identify predetermined, necessary parameters associated with the car rental context as including: dates, location, rental agency, and price range parameters. The received query only provides information for the location and rental agency parameters, so the system would determine that the dates and price range parameters are missing parameters. Once it has determined that one or more necessary parameters in a query are missing parameters, the system identifies potential contextual data based on the query, the context, and the missing parameters. The system uses the potential contextual data to supplement the query by providing some or all of the missing parameters. If the system determines that one or more necessary parameters are still missing parameters after supplementing the query with the potential contextual data, it will prompt the user with one or more questions designed to refine the missing parameters.

System 100 includes query block 102, processing block 104, data block 106, and customized action block 108. System 100 may be any suitable hardware, software, or both, for implementing the features described in the present disclosure, and will generally be referred to, herein, as the system. In some implementations, processing block 104 identifies potential contextual data associated with query 102 based on, for example, user data. Data block 106 may include user data. Processing block 104 processes query 102 and data from data block 106 to determine potential contextual data. Processing block 104 determines a context from query 102, identifies potential contextual data based on the context and query 102, and determines a level of confidence for an association of the potential contextual data and the context. In some implementations, processing block 104 is responsible for processing query 102 and the context to determine whether there is sufficient information to perform an action, determining one or more missing parameters from query 102 when there is not sufficient information, and identifying potential contextual data based on the one or more missing parameters, the context, and query 102. The potential contextual data are used to customize an action in customized action block 108. The functionality of system 100 is described in detail below in relation to flow diagram 200 of FIG. 2.

System 100 identifies potential contextual data in processing block 104. Potential contextual data may include one or more data points from data block 106 that system 100 expects to be associated with the context determined in processing block 104. In some implementations, processing block 104 identifies potential contextual data by building an event model. The functionality of the event model is described below in detail in relation to FIG. 4. In some implementations, processing block 104 identifies potential contextual data by identifying trend in data points from data block 106 over time.

System 100 determines a level of confidence for the association of the potential contextual data and the context in processing block 104. In some implementations, the customized action in customized action block 108 is presenting a refining prompt when the level of confidence determined in processing block 104 is sufficiently low. In some implementations, the customized action in customized action block 108 is providing a response to the query 102 when the level of confidence determined in processing block 104 is sufficiently high. In some implementations, the customized action in customized action block 108 is based on query 102 supplemented by the potential contextual data. In some implementations, the customized action in customized action block 108 is ranking the one or more missing parameters identified in processing block 104 and presenting a refining prompt based on the ranking when the level of confidence determined in processing block 104 is sufficiently low. In some implementations, the customized action in customized action block 108 is presenting options to the user for the missing parameters determined in processing block 104. In some implementations, the customized action in customized action block 108 is performing an action that is the intended result of query 102.

Figure 2:
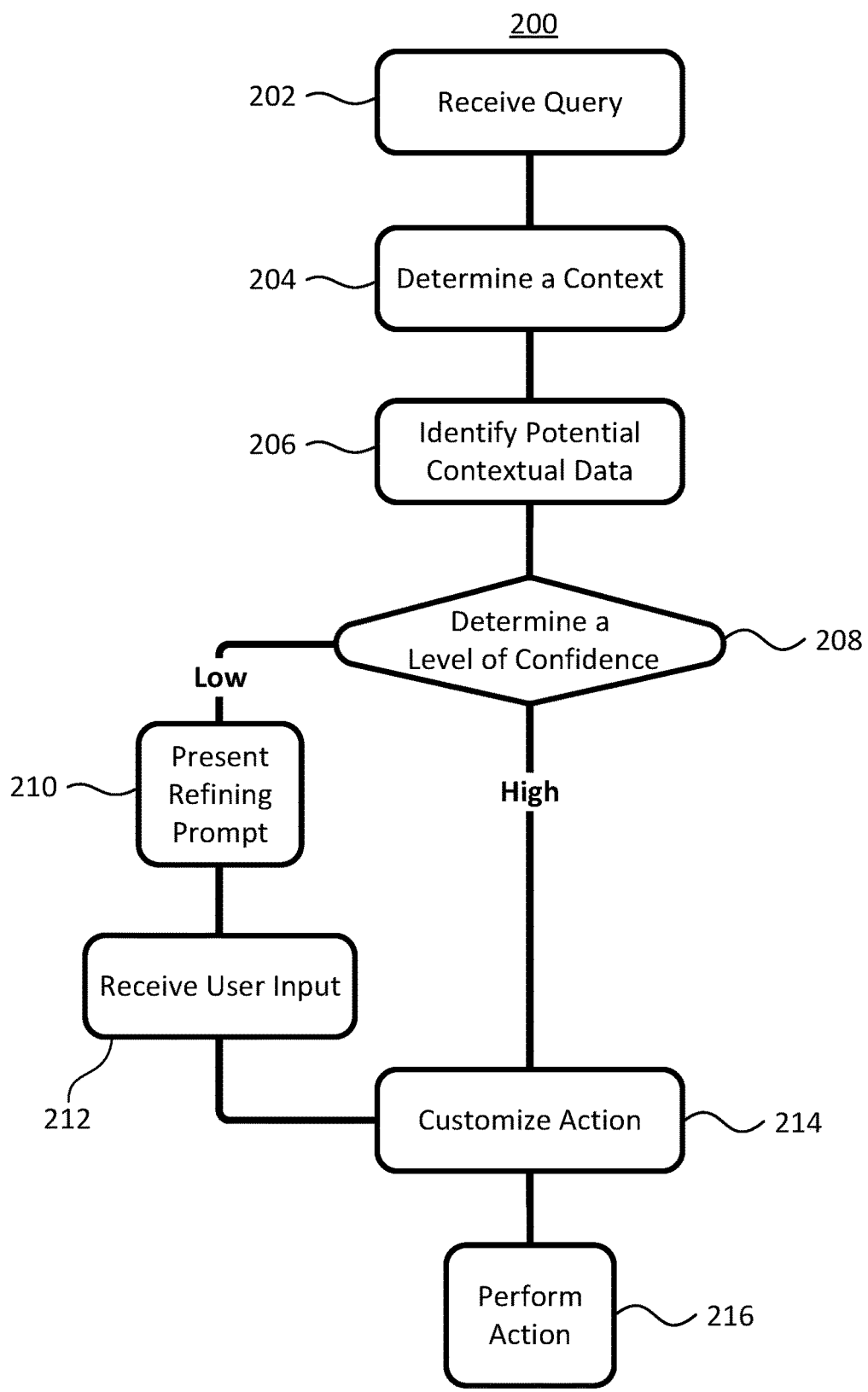
FIG. 2 shows a flow diagram of illustrative steps for customizing an action using potential contextual data in accordance with some implementations of the present disclosure.

FIG. 2 shows a flow diagram 200 of illustrative steps for customizing an action using potential contextual data in accordance with some implementations of the present disclosure. Illustrative steps to receive query 202, determine a context 204, identify potential contextual data 206, determine a level of confidence 208, present a refining prompt 210, receive user input 212, customize an action 214, and perform an action 216 are shown. In step 202, the system receives a query. It will be understood that any suitable types of queries or combinations thereof may be used in the context of the present disclosure. For example, the user may submit a query using a touchscreen keyboard.

In step 204, the system processes the query and determines a context for the information in the query. There may be more than one context determined for each query. The context may be general or specific. For example, [Upcoming Performances] is a general context, and [Rachel's Violin Recital at Avery Fisher Hall] is a specific context. Each context is associated with contextual data. In some implementations, the system will attempt to assign as specific a context as possible to the query based on, for example, user data, database data associated with one or more users in a database, user preferences, confidence in the determined context, or any combination thereof. In some implementations, the system may use a data buffer to determine as specific a context as possible. The data buffer may store any suitable, retrievable data, including user data, database data, and user preference data. The system may compare the data stored in the data buffer with the express and implied terms of a query and determine one or more contexts for the query based on the comparison. In a suitable approach, the system may identify as specific a context as possible from among the one or more determined contexts based on the type of data associated with each determined context. For example, the system may determine that a context associated with user data, such as a calendar event, is more specific than a context associated with generic user preference data or a context associated with database data. In another suitable approach, the system may identify as specific a context as possible from among the one or more determined contexts based on the system's respective confidence in each determined context. The system may determine the confidence for a determined context based on an association between contextual data and the determined context. In some implementations, the system may determine a general context and make use of the techniques described below in relation to identifying potential contextual data with a high confidence association with the general context, which is the functional equivalent of determining a more specific context. It will be understood that the system may implement any suitable technique or combination of techniques in order to determine a context for a query.

In step 206, the system identifies potential contextual data based on the query and on the context. The potential contextual data may include relevant contextual data that are determined to be associated with the context of the query. In a suitable approach, the system may identify potential contextual data based on a content and sentiment analysis of user data associated with a context, including, for example, reviews the user has posted on a social networking web site. In another suitable approach, the system may identify potential contextual data based on an aggregate analysis of contextual data anonymously associated with one or more other users in a database. The database may include contextual data associated with a pool of other users who share similar demographics, interests, occupations, any other suitable quality or identifier, or any combination thereof, with the user inputting the query. In another suitable approach, the system may identify potential contextual data based on manually curated data, including, for example, an event model of current and near term events related to the user. In another suitable approach, the system may identify potential contextual data based on entity graph data. As used herein, an entity graph is a structure that organizes nodes representing entities based on, for example, relationships that exist between the entities represented by respective nodes. For example, in some implementations, a connection between two nodes may define a particular relationship between the entities represented by those nodes. As used herein, an entity is a thing or concept that is singular, unique, well defined, and distinguishable. For example, an entity may be a person, place, item, idea, topic, abstract concept, concrete element, other suitable thing, or any combination thereof.

In some implementations, the system identifies potential contextual data by using a prioritized order of sources. The system may apply an order of priority to the sources of contextual data based on the relevance of a source to a particular context. The system may determine relevance of a source to a particular context based on past queries, data, associations, levels of confidence, preferences, ambiguity levels, missing parameters, any other suitable relevance data, or any combination thereof. For example, for a query associated with the scheduling context, the system may prioritize the user's calendar as a source of potential contextual data. The system may then access sources of contextual data in order of descending priority for a particular context. In an example, for a query associated with the context of booking a restaurant reservation, the system may prioritize access to social graph data, which may include, for example, posts related to check-ins at restaurants, shared links to restaurant web pages, and reviews and recommendations of restaurants. In some implementations, the system may prompt the user with a request to identify what sources the system should access to identify potential contextual data. In some implementations, the user may set preferences for the order of priority of sources for particular contexts. It will be understood that any suitable technique or combination of techniques may be used to identify potential contextual data.

In step 208, the system determines a level of confidence for an association between identified potential contextual data and the context of the query. The level of confidence may be an indication of the relevance of a potential contextual data point to the determined context. In some implementations, the system determines a level of confidence for a potential contextual data point based on the other identified potential contextual data points, their respective levels of confidence, the times, dates, and locations associated with the potential contextual data points, any other suitable indication of relevance, or any combination thereof. The system may assign a potential contextual data point a higher or lower level of confidence based on the identification of or identified absence of related, potential contextual data points. The system may determine levels of confidence using an iterative process or any other suitable technique. In an example, the system may receive the query [Should I pack an umbrella for my trip to Springfield?] and may identify weather forecasts for Springfield, Oreg. and Springfield, Mo. as potential contextual data points, each with a low level of confidence. The system may then identify an email indicating plans to visit the user's brother and his wife in Missouri next week, and it may then determine a higher level of confidence for the Springfield, Mo. weather forecast and a lower level of confidence for the Springfield, Oreg. weather forecast. The system may identify a potential contextual data point indicating the exact dates of the user's trip, and the system may then determine an even higher level of confidence for the Springfield, Mo. weather forecast. In some implementations, the system may dynamically update the determined level of confidence for a potential contextual data point based on new user input. In the above example, the system may receive new user input indicating that the query is associated with Springfield, Mo., and it may then it would determine a new, higher level of confidence for the Springfield, Mo. weather forecast potential contextual data point. In some implementations, the system may use the respective levels of confidence to identify the potential contextual data point with the highest level of confidence between two or more competing, related contextual data points. In an example, for the query [Book a car], the system might identify two calendar entries, the first for a trip to London on February 18th and the second for a trip to Chicago on March 17th, as competing potential contextual data points. The system may assign levels of confidence based on the number of points of competing potential contextual data it identifies for a particular context of the query. In the example, the system might assign a low level of confidence to both of the identified calendar entries. Whereas, if the system only identifies one calendar entry, for example, the trip to Chicago on March 17th, as a potential contextual data point, then the system would assign the Chicago trip calendar entry a relatively high level of confidence, indicative of the stronger association between one identified potential contextual data point and the context of the query. In some implementations, the system may determine a level of confidence for a potential contextual data point based on entity graph data, social graph data, the number of user data points supporting an association between a potential contextual data point and a context, any other suitable weighing factor, or any combination thereof.

The level of confidence may be any suitable metric for quantifying the relatedness of the potential contextual data and the context. In some implementations, the system assigns each potential contextual data point a numeric level of confidence. For example, the system may determine a normalized confidence value in the range of 0.0-1.0 for each potential contextual data point. Levels of confidence may be either high or low. For example, the system may determine that a level of confidence less than or equal to 0.3 is low and a level of confidence greater than 0.3 is high. The system may determine which levels of confidence are high and low valued based on the relative levels confidence for each potential contextual data point, a sliding scale, a predetermined threshold, or any other suitable technique. In some implementations, the user sets preferences for high and low levels of confidence. For example, the user may set a preference for the system to recognize only potential contextual data points with a level of confidence greater than 0.9 as having a high level of confidence. It will be understood that the aforementioned metrics are merely exemplary and that the system may use any suitable equation, technique, other suitable processing, or any combination thereof, to determine the level of confidence for each potential contextual data point.

In step 210, the system presents to the user a refining prompt when it determines that potential contextual data have a low or otherwise insufficient level of confidence. The refining prompt may be a question designed to confirm that a potential contextual data point is associated with the context of the query, a question designed to narrow the context, a question designed to narrow the pool of potential contextual data, any other suitable question, or any combination thereof. In some implementations, the refining prompt is a yes-or-no question, but it will be understood that in some implementations, the refining prompt may be a question that requires a more substantive response. In step 212, the system receives user input in response to the refining prompt. It will be understood that user input may include any suitable types of user input or combinations of types of user input, in the context of the present disclosure.

In step 214, the system customizes an action in response to the query based the potential contextual data and the level of confidence. As shown in FIG. 2, the system may use potential contextual data points with a high level of confidence, potential contextual data points for which user confirmation was received in step 212, or any combination thereof, to customize the action. In some implementations, customizing the action may include using potential contextual data to customize the action for the user inputting the query. In step 216, the system performs the action.

Figure 3:
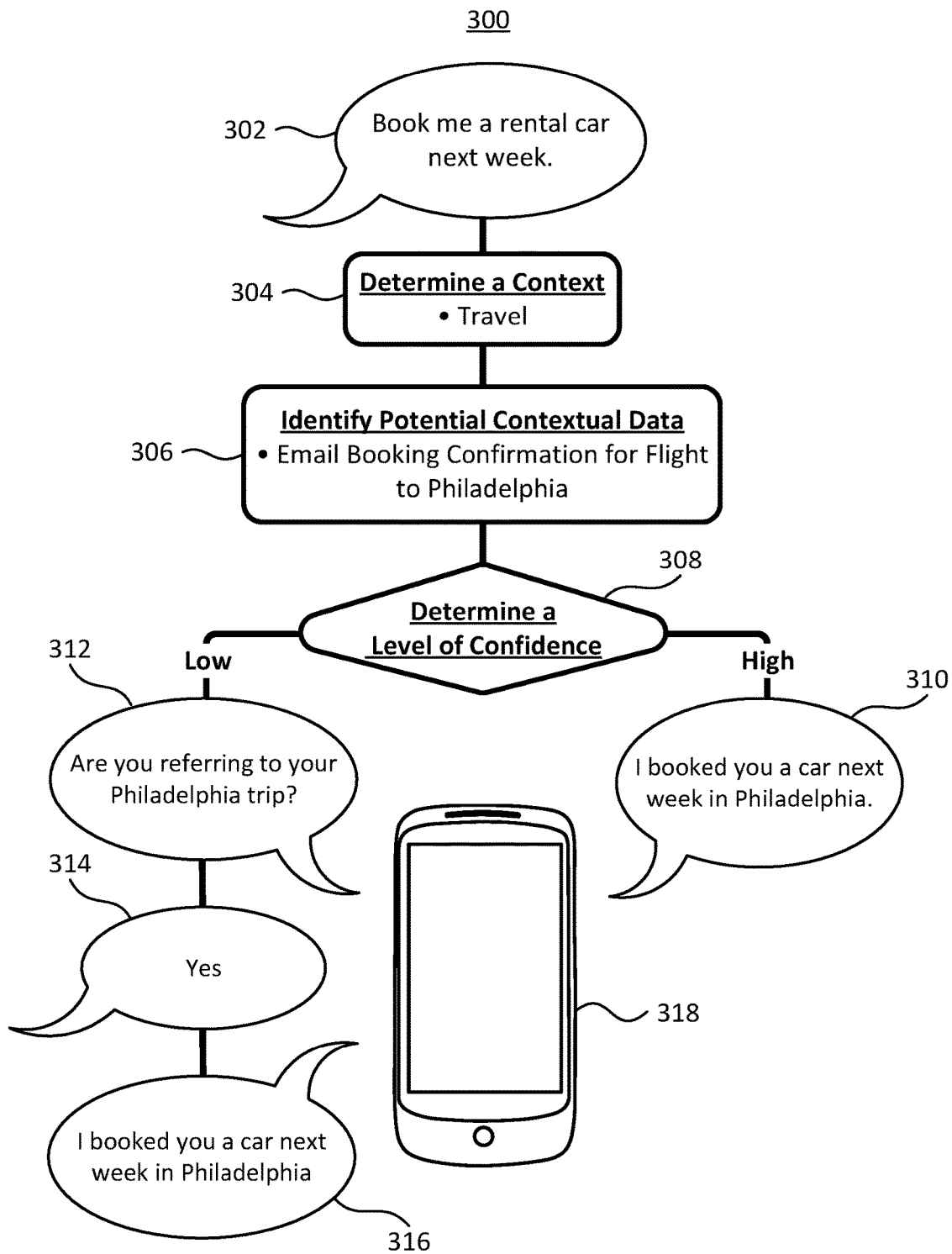
FIG. 3 shows an exemplary user interface sequence for customizing an action using potential contextual data in accordance with some implementations of the present disclosure.

FIG. 3 shows an exemplary user interface sequence 300 for customizing an action using potential contextual data in accordance with some implementations of the present disclosure. Illustrative steps to receive a query, determine a context, identify potential contextual data, receive user input confirming the potential contextual data, and customize an action based on the potential contextual data are shown. The system is shown to be implemented by user mobile device 318. It will understood that mobile device 318 is described for purposes of illustration, not by way of limitation.

In step 302, the system receives a query: [Book me a rental car next week]. In some implementations, the system may receive a query that requests information, for example, [What other travel arrangements do I need to make for my trip next week?]

In step 304, the system processes the query and determines a context, [Travel], for the information in the query. The travel context is an example of a general context. It will be understood that the system could also determine a specific context for the query, for example [Out of town travel next week].

In step 306, the system identifies an email booking confirmation for a flight to Philadelphia as potential contextual data based on the query and on the travel context. The email booking confirmation is associated with the travel context relative to the user.

In step 308, the system determines a level of confidence for the association between the email booking confirmation and the travel context. The system uses any suitable technique, user preference, or combination thereof, to determine whether the level of confidence is high or low. If the system determines the level of confidence is sufficiently high, the system will proceed to step 310. If the system determines the level of confidence is sufficiently low, the system will proceed to step 312.

In step 310, the system performs an action—booking a rental car next week for the user—in response to the query and based the email booking confirmation, when it determines the email booking confirmation has a high or otherwise sufficient level of confidence. The action performed by the system may include presenting confirmation of the performed action to the user—[I booked you a car next week in Philadelphia]. The system may present confirmation of the performed action vocally, in a textual display on the user device, by emailing, texting, adding an entry to the user's calendar, or by any other suitable medium for conveying the confirmation to the user.

In step 312, the system presents to the user a refining prompt—[Are you referring to your Philadelphia trip]—when it determines the email booking confirmation has a low or otherwise insufficient level of confidence. In step 314, the system receives the user input [Yes] in response to the refining prompt. The system processes the user input and the potential contextual data and performs an action in response to the query based on the potential contextual data in step 316. The action performed by the system in step 316 may be identical to the action described with respect to step 310. The action performed by the system in step 316 may include determining an updated level of confidence for the potential contextual data based on the user input in response to the refining prompt. The action performed by the system in step 316 may include presenting an additional refining prompt, making a suggestion, providing information, or any other suitable action responsive to the query.

Figure 4:
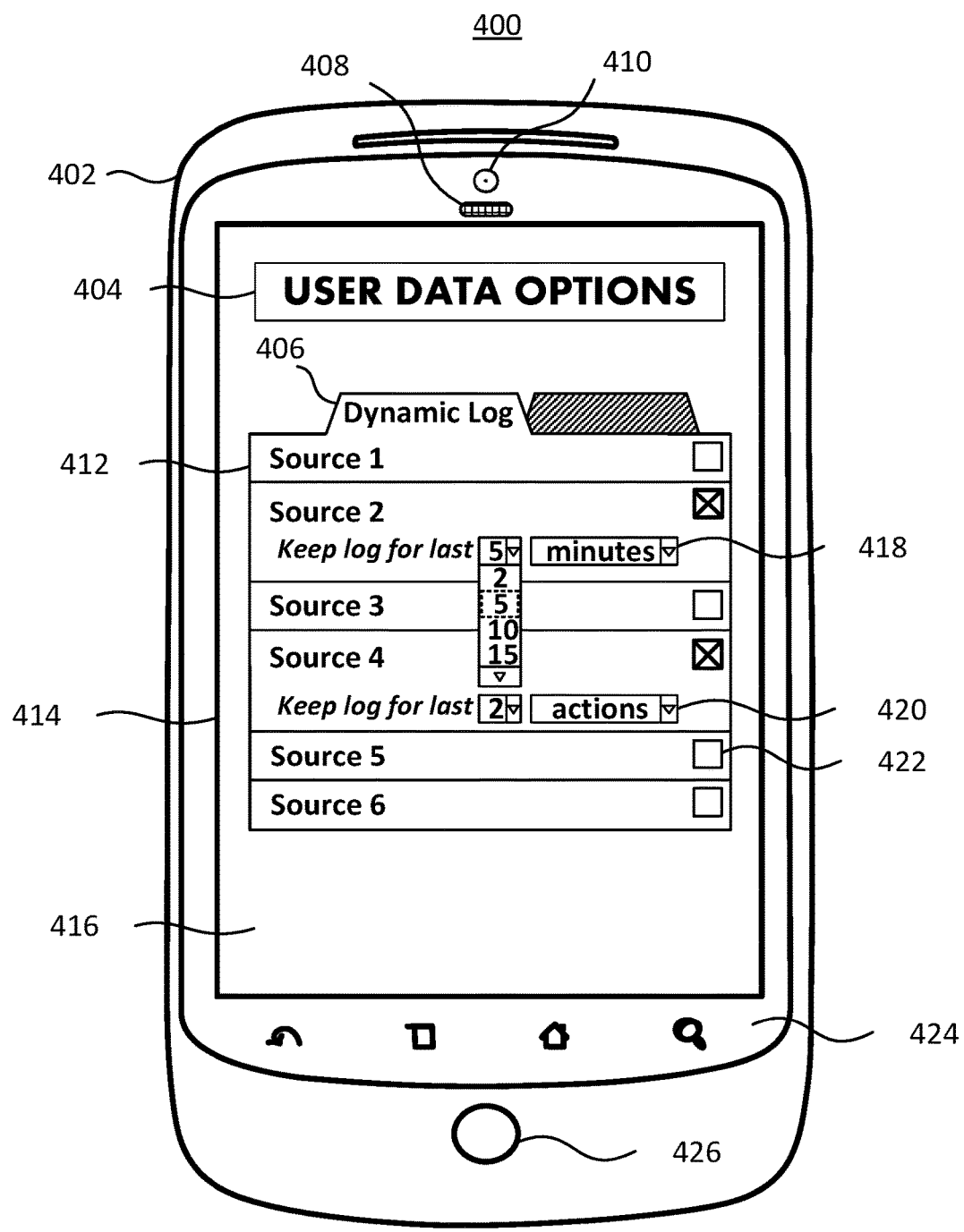
FIG. 4 shows an illustrative example of a user interface in accordance with some implementations of the present disclosure.

FIG. 4 shows an illustrative example of a user interface 400 in accordance with some implementations of the present disclosure. In some implementations, user interface 400 is implemented on a smartphone 402, including display 414, and touchscreen 416. The smartphone may include microphone 408, camera 410, electromechanical button 426, and soft keys 424. As illustrated in FIG. 4, smartphone 402 may display User Data Options Screen 404.

User Data Options Screen 404 may include dynamic log preferences 406. In some implementations, the system uses a dynamic log to identify potential contextual data. Data stored in the dynamic log includes contextual data, historical contextual data, or both, corresponding to data and actions associated with the present time or a time in the recent past. The recent past may include, for example, the last 15 minutes. The dynamic log may store contextual data associated with a single relevant user, for example, the user inputting the query, contextual data associated with one or more other users, or both. In an example, contextual data stored in the dynamic log may include an email the user sent to a friend five minutes ago and a calendar appointment indicating the user is presently scheduled to meet a former colleague for lunch downtown.

Dynamic log preferences 406 include user-editable features for customizing the functionality of the dynamic log according to user preferences. As illustrated in FIG. 4, dynamic log preferences 406 may include a mechanism for selection and de-selection of the sources from which the system may retrieve contextual data. For example, Source 1 412, may be email, telephone, internet browsing history, or any suitable local or remote source, relative to the smartphone, from which data can be retrieved. Checkbox 422 is an illustrative example of a mechanism for selection and de-selection of sources. Dynamic log preferences 406 may also include mechanisms for selection of the duration of time or the quantity of actions that the dynamic log can store. In the illustrated example FIG. 4, dropdown menu 418 shows a selection of [5 minutes], indicating that the dynamic log will store Source 2 data for the present time and the last five minutes. Dropdown menu 420 shows a selection of [2 actions], indicating that the dynamic log will store the last two temporally occurring data points of Source 4 data. Dynamic log preferences 406 may display the contextual data currently stored in the dynamic log. The system may dynamically update the dynamic log preferences 406 in real-time by adjusting the display of the contextual data currently stored in the dynamic log in accordance with the user's selections and de-selections. For example, if the user selects Source 1 412, the system will automatically update to include the contextual data retrieved from Source 1 412 in its display of the dynamic log content.

In some implementations, User Data Options Screen 404 may include preferences associated with an event model. Event model, as used herein, refers to any suitable structured collection of data and relationships associated with current and near term events. The system may identify current and near term events using the contextual data. Current and near term events may include data and actions that are associated with at least a single relevant user and a present or future date, time, or both. For example, current and near term events may include coffee with Chelsea on Tuesday and a job interview in Palo Alto on Friday at 3 pm. The event model may include data associated with the identified current and near term events, for example, dates, times, and people. In the above example, the event model would include at least Chelsea and Tuesday for the first event and Palo Alto, Friday, 3 pm for the second event. The preferences associated with an event model may include a mechanism for selection and de-selection of sources from which the system may identify current and near term events related to the user to be used in building the event model. The User Data Options Screen 404 may display the events that are currently stored in the event model. The system may dynamically update the User Data Options Screen 404 in real-time by adjusting the display of the events currently stored in the event model in accordance with the user's selections and de-selections. For example, if the user de-selects a source, the events stored in the event model that were identified from that de-selected source will be removed from the display. In some implementations, the system may dynamically update the user's calendar with event model data. The User Data Options Screen 404 may include user control preferences for this feature.

In some implementations, User Data Options Screen 404 may include a user profile. The user profile may include user-specific information, including, for example, home and work addresses; favorites information, for example, a favorite type of cuisine or a favorite movie theater; relationship information, for example, identifying family members, friends, a significant other, or a tennis partner; affiliation information, for example, identifying teams, clubs, unions, boards, or committees to which the user belongs; and any other suitable user-specific information. The user profile may include a mechanism for input and modification of the user profile content and privacy controls for limiting the system's access to and use of user data. It will be understood that the system will allow the user to grant or deny access to any one or more sources of user data to be used as contextual data in accordance with the present disclosure. The system will not access user data designated as private by the user.

In some implementations, User Data Options Screen 404 may include additional system functionality preferences. The system may include a mechanism for user entry of system functionality preferences, which may include, a maximum number of refining prompts to be asked, threshold confidence values, limits on when customization is performed, limits on the extent to which database or social graph data are retrieved, controls for limiting the sharing of data, controls for anonymously sharing data, or any other suitable preferences for customizing the system's functionality. In some implementations, the User Data Options Screen 404 includes preferences relating to ambiguity and missing parameters, which are described in more detail below with respect to FIG. 5. It will be understood that the aforementioned preferences are merely exemplary, and that User Data Options Screen 404 may be configured to display any suitable user-editable preferences for customizing the system.

Figure 5:
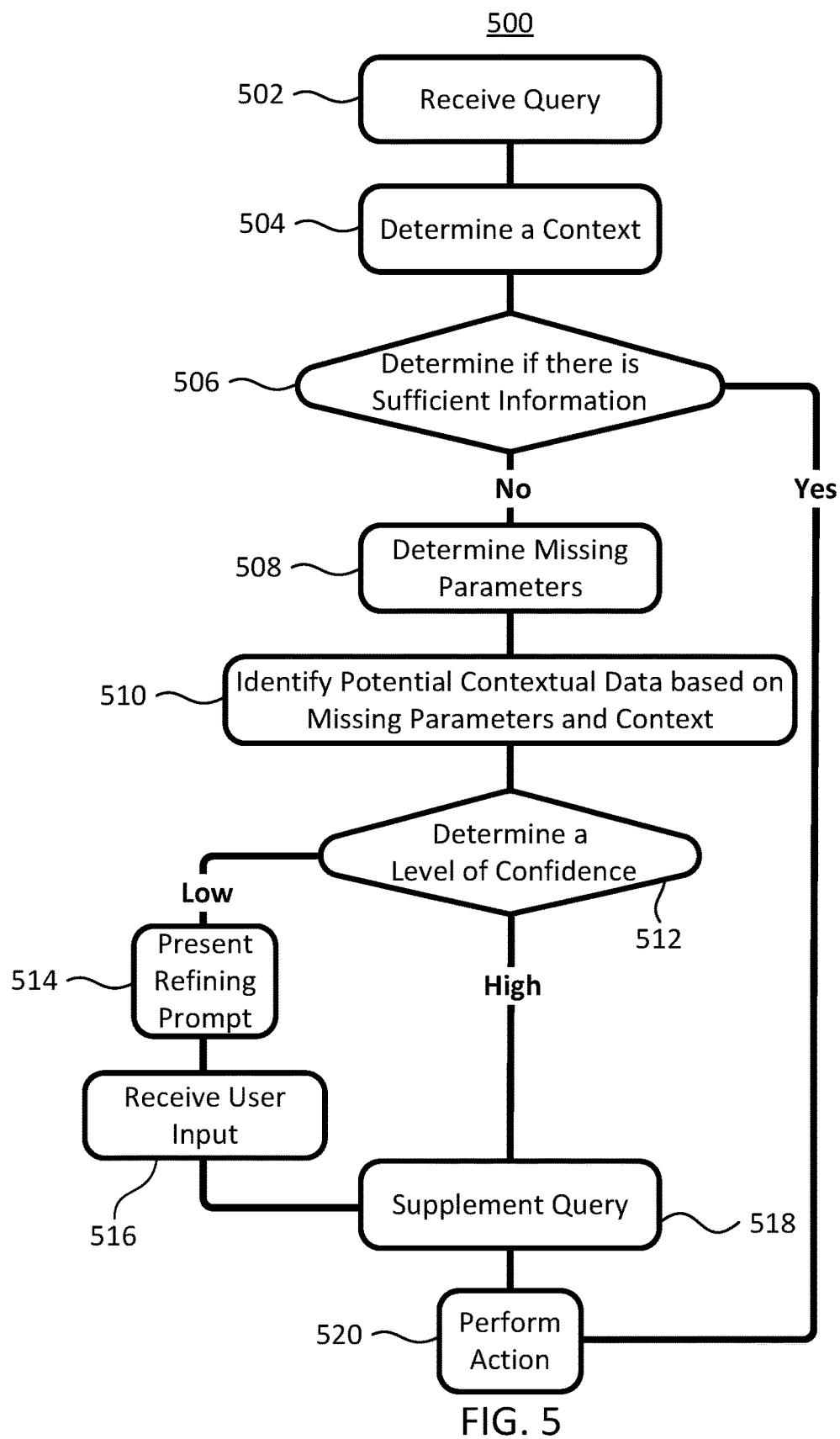
FIG. 5 shows a flow diagram of illustrative steps for supplementing a query using potential contextual data in accordance with some implementations of the present disclosure.

FIG. 5 shows a flow diagram 500 of illustrative steps for supplementing a query with potential contextual data in accordance with some implementations of the present disclosure. Illustrative steps to receive query 502, determine a context 504, determine if there is sufficient information 506, determine missing parameters 508, identify potential contextual data based on missing parameters and context 510, determine a level of confidence 512, present a refining prompt 514, receive user input 516, supplement query 518, and perform an action 520 are shown.

In step 502, the system receives a query. In step 504, the system processes the query and determines a context for the information in the query. In step 506, the system processes the query and the context to determine whether there is sufficient information to perform an action in response to the query. In a suitable approach, the system may integrate steps 506 and 508 into a single step. If the system integrates steps 506 and 508, the system may determine whether there is sufficient information based on what the system determines are missing parameters. In another suitable approach, the system may perform step 506 independently from step 508. The system may determine whether or not there is sufficient information by determining if there are missing parameters for the query. For example, the system may determine there is sufficient information to perform an action when it determines there are no missing parameters for the query. In step 520, the system performs an action based on the query and the context when it determines that there is sufficient information to perform an action.

In some implementations, the system determines whether or not there is sufficient information to perform an action by determining an ambiguity level for the query. The ambiguity level may be any suitable metric for quantifying the ambiguousness of a query. The system may determine the ambiguity level for a query based on the included and missing parameters of the query, past similar queries, any other suitable indicator of ambiguity, or any combination thereof. For instance, the system may determine an ambiguity level for a query based on included ambiguous pronoun parameters, for example, [someone], [us], [somewhere], [sometime], or any other pronoun lacking a clear antecedent basis. In some implementations, the system assigns each query a numeric ambiguity level. For example, the system may determine a normalized ambiguity level value in the range of 0.0-1.0 for each query. In some implementations, the system may rank the query based on the ambiguity level. For example, ambiguity levels in the range of 0.0-0.3 may be highly ambiguous, 0.3-0.7 may be semi-ambiguous, and 0.7-1.0 may be non-ambiguous. The system may determine the ranking of ambiguity levels based on the relative numeric ambiguity values, a sliding scale, a predetermined threshold, or any other suitable technique. In some implementations, the user sets preferences for ambiguity level ranking. For example, the user may set a preference for the system to recognize only queries with an ambiguity level less than 0.01 as non-ambiguous. It will be understood that the aforementioned metrics are merely exemplary and that the system may use any suitable equation, technique, other suitable processing, or any combination thereof, to determine the ambiguity level for a query. In some implementations, the system may determine an updated context for the query based on the determined ambiguity level. For example, the system may attempt to assign as specific a context as possible to the query when it determines the query has a low ambiguity level.

In step 508, the system processes the query to determine one or more missing parameters when it determines that there is not sufficient information to perform an action. In an example, for a query [Buy tickets for the hockey game this Friday], the system may determine that missing parameters include: the venue, the preferred price, and the number of guests attending.

In step 510, the system identifies potential contextual data based on the one or more missing parameters, the context, and the query. The identified potential contextual data may include relevant contextual data that are determined to be associated with the context, the one or more missing parameters, or both. In some implementations, the identified potential contextual data may include predictive preference data that are determined to be associated with the context, the one or more missing parameters, or both. As used herein, predictive preference data refer to trends in contextual data over time. The predictive preference data may be associated with a single relevant user, for example, the user inputting the query. In an example, for the above-described query [Buy tickets for the hockey game this Friday,] the system may identify predictive preference data that includes a trend in the user-specific contextual data indicating that the user frequently buys tickets for the PHILADELPHIA FLYERS home games. The predictive preference data may be associated with one or more other users, for example, other users who share similar demographics, interests, occupations, any other suitable quality or identifier, or any combination thereof, with the user inputting the query. For example, the system may identify predictive preference data from contextual data associated with a pool of users, who share a similar occupation and an interest in the PHILADELPHIA FLYERS, that includes a trend showing a preference for the best available center ice seats. It will be understood that predictive preference data may be identified as potential contextual data according to any implementation of the present disclosure. In some implementations of flow diagram 200 of FIG. 2, the system may identify potential contextual data in step 206 that includes predictive preference data that are associated with the context of the query.

In some implementations, the system identifies potential contextual data based on a machine learning process. The machine learning process may include functionality for training the system to identify potential contextual data based on past queries, data, associations, levels of confidence, preferences, ambiguity levels, missing parameters, any other suitable training data, or any combination thereof. The functionality for training the system may be based on data associated with a single relevant user, for example, the user inputting the query, or based on aggregate data associated with one or more other users. The functionality for training may be based on aggregate data associated with other users who share similar demographics, interests, occupations, any other suitable quality or identifier, or any combination thereof, with the user inputting the query. It will be understood that the system may identify potential contextual data based on a machine learning process according to any implementation of the present disclosure. In some implementations of flow diagram 200 of FIG. 2, the system may identify potential contextual data in step 206 based on a machine learning process.

In step 512, the system determines a level of confidence for an association between the identified potential contextual data and the context of the query, an association between the identified potential contextual data and the one or more missing parameters, or both.

In step 514, the system presents the user with a refining prompt when it determines that potential contextual data points have a low or otherwise insufficient level of confidence. The refining prompt may be a question designed to confirm an association for a potential contextual data point, a question designed to narrow the context, a question designed to narrow the pool of potential contextual data, any other suitable question, or any combination thereof. In step 516, the system receives user input in response to the refining prompt. The system may present the user with one or more additional refining prompts after it receives the user input. The system may prioritize the order in which it presents refining prompts to the user based on the level of confidence, the ambiguity level, the missing parameters, any other suitable metric, or any combination thereof. In some implementations, the system may present the user with a refining prompt that displays options, which may include one or more potential contextual data points, for the one or more missing parameters and includes a mechanism for user selection of one or more of the options.

In step 518, the system supplements the query based on the potential contextual data and the level of confidence. They system may supplement the query by filling or disambiguating missing parameters using potential contextual data. In some implementations, the system may supplement the query with the user profile information described with respect to FIG. 4.

In step 520, the system performs an action in response to the supplemented query. In an example, for the received query [Book me a rental car near home from Monday through Friday of next week], the system may determine that the location, rental agency, and car class parameters are missing parameters. The system might identify potential contextual data, using a machine learning process, indicating that the user has expressly asked the system to book a car with AVIS in every preceding query in the car rental context. The system may use that potential contextual data and the user's home address near Market Street in Philadelphia, stored in the user profile, to identify the AVIS Rental Center closest to the user's home. The system may then identify predictive preference data associated with users of similar demographics indicating a trend towards renting a compact car. The system may use the identified potential contextual data to supplement the query by filling the location, rental agency, and car class parameters, resulting in the supplemented query: [Book me a compact rental car at the AVIS Rental Center on Market Street in Philadelphia from Monday through Friday of next week]. Depending on the level of confidence the system assigns each potential contextual data point, the system may then prompt the user for confirmation of the supplemented query—[Would you like me to book a compact rental car at the AVIS Rental Center on Market Street in Philadelphia?]—or book the car in response to the supplemented query.

Figure 6:
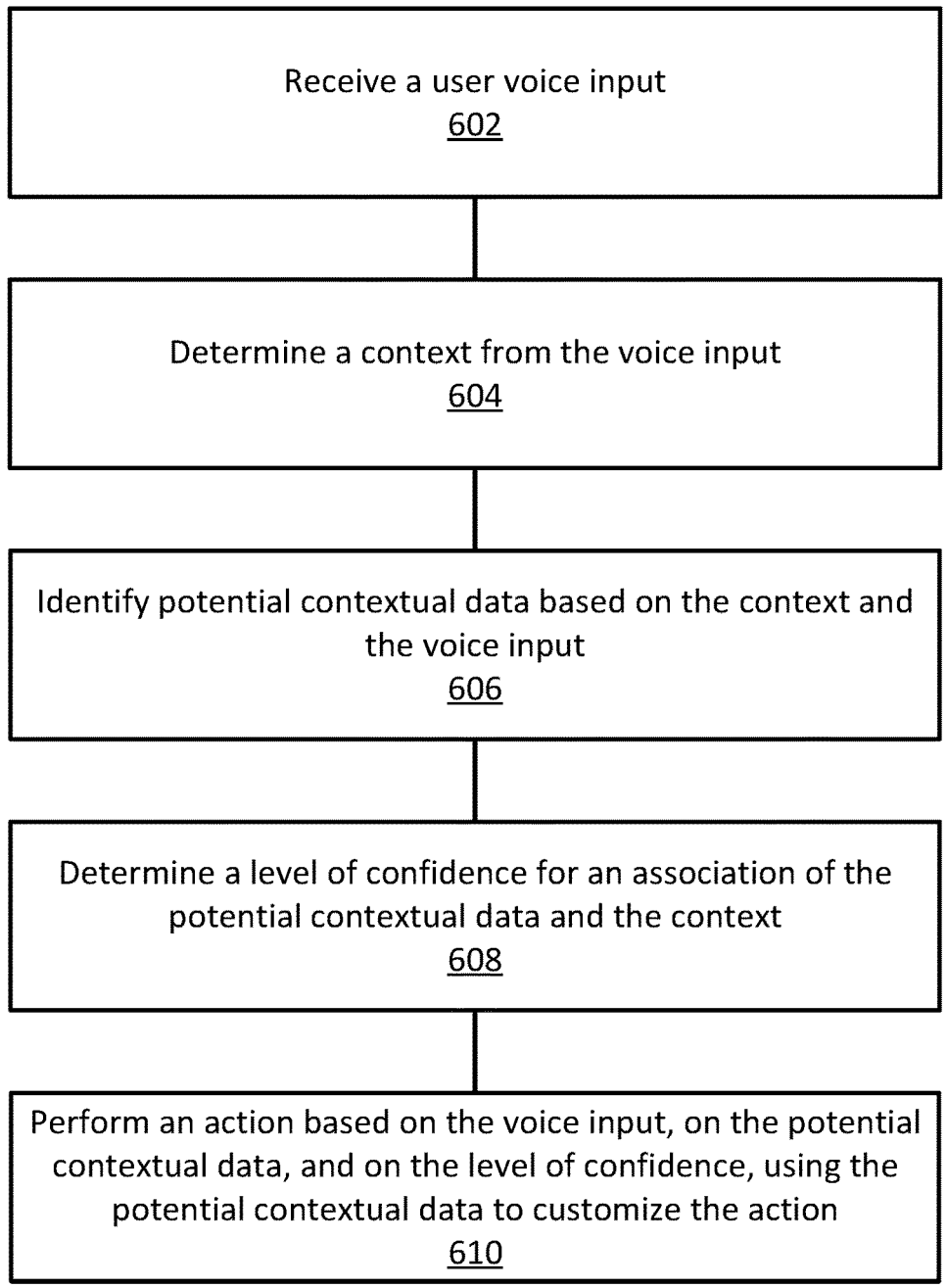
FIG. 6 shows a flow diagram of illustrative steps for customizing an action in accordance with some implementations of the present disclosure.

FIG. 6 shows a flow diagram 600 of illustrative steps for customizing an action in accordance with some implementations of the present disclosure. Illustrative steps to receive a user voice input 602, determine a context from the voice input 604, identify potential contextual data based on the context and the voice input 606, determine a level of confidence for an association of the potential contextual data and the context 608, and perform an action based on the voice input, the potential contextual data, and the level of confidence, using the potential contextual data to customize the action 610 are shown.

In some implementations, the system may implement the steps of flow diagram 600 as part of a search engine. Receive user voice input step 602 would correspond to receiving a query for a search, and perform customized action step 610 would correspond to retrieving customized results in response to the query for search. In some implementations, the system may implement the steps of flow diagram 600 in order to supply user-specific information to a fillable form, on the internet or otherwise, at perform customized action step 610.

Figure 7:
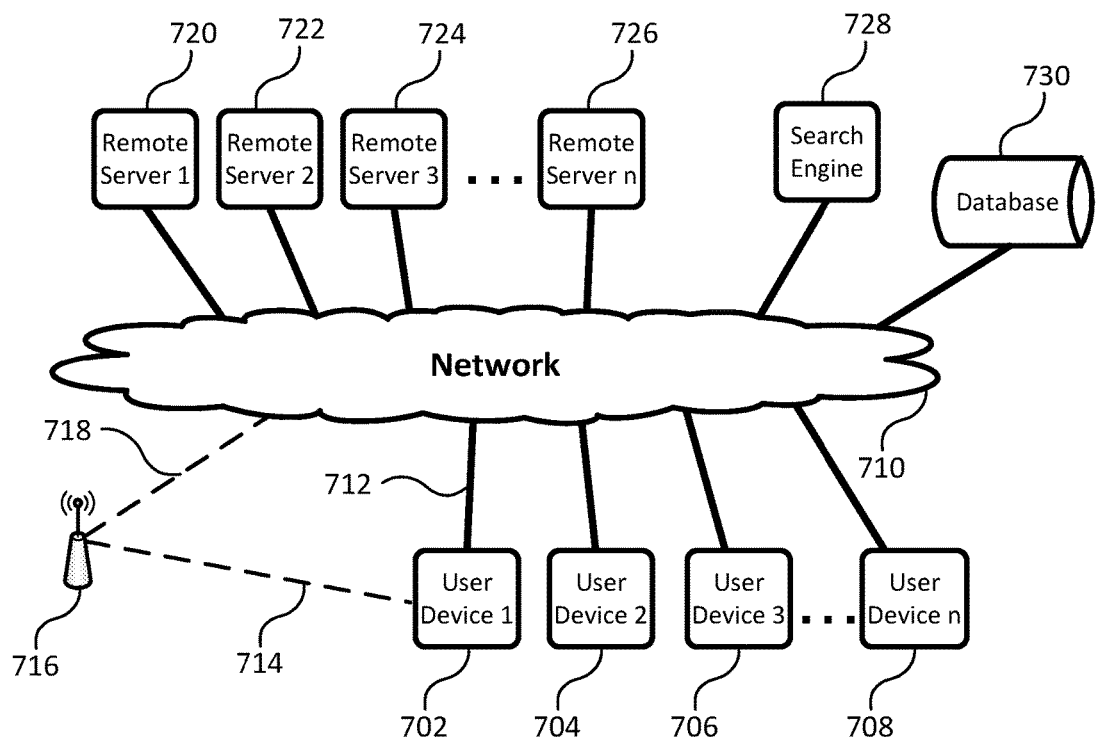
FIG. 7 shows an illustrative computer system for customizing an action in accordance with some implementations of the present disclosure.
Figure 8:
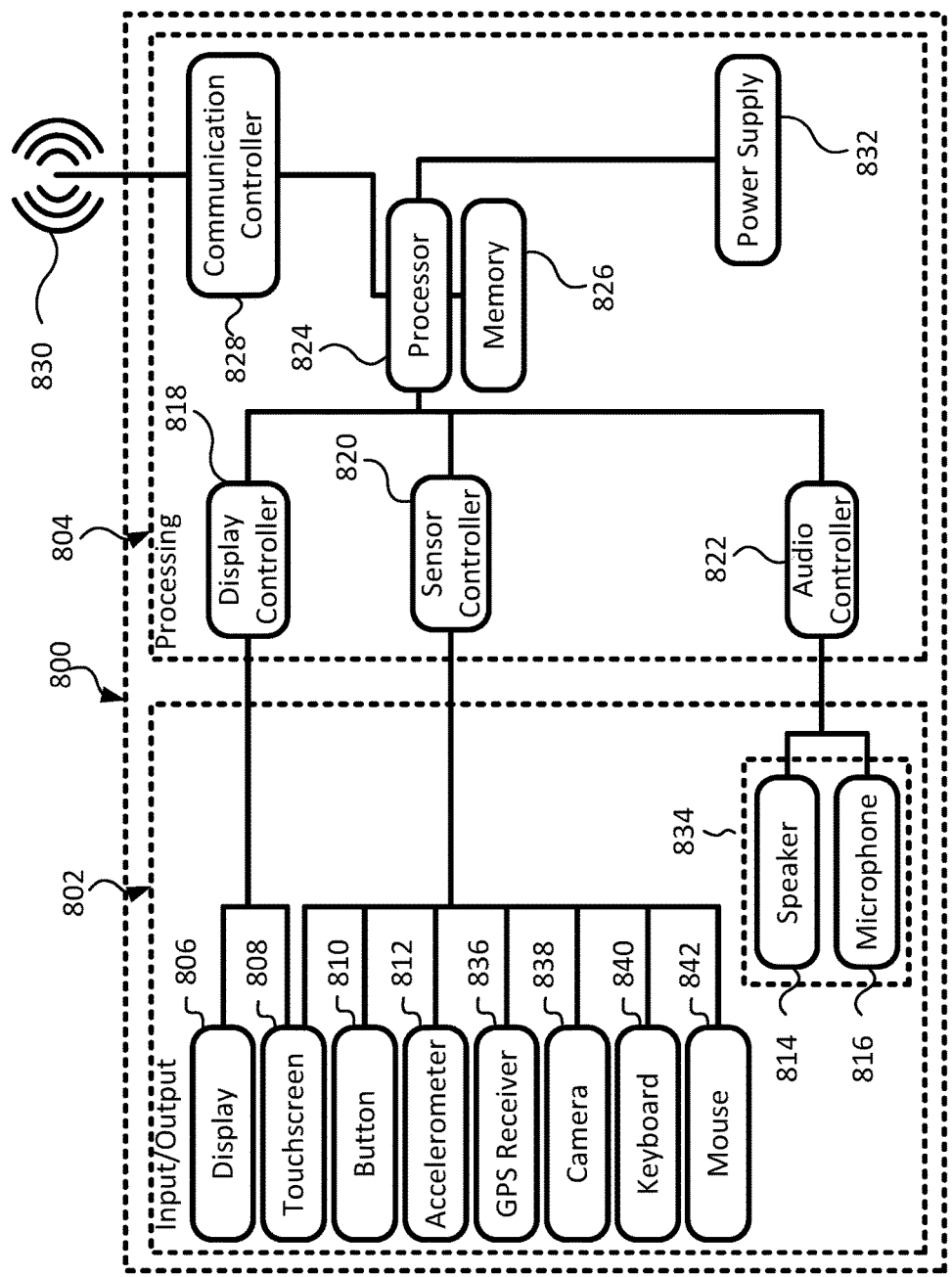
FIG. 8 is a block diagram of an illustrative user device in accordance with some implementations of the present disclosure.

The following description and accompanying FIGS. 7 and 8 describe an illustrative computer system and user device that may be used in some implementations of the present disclosure. It will be understood that elements of FIGS. 7 and 8 are merely exemplary and that any suitable elements may be added, removed, duplicated, replaced, or otherwise modified.

It will be understood that the system may be implemented on any suitable computer or combination of computers. In some implementations, the system is implemented in a distributed computer system including two or more computers. In an example, the system may use a cluster of computers located in one or more locations to perform processing and storage associated with the system. It will be understood that distributed computing may include any suitable parallel computing, distributed computing, network hardware, network software, centralized control, decentralized control, any other suitable implementations, or any combination thereof.

FIG. 7 shows an illustrative computer system that may be used by the system in accordance with some implementations of the present disclosure. System 700 may include one or more user device 702. In some implementations, user device 702, and any other device of system 700, includes one or more computers and/or one or more processors. In some implementations, a processor includes one or more hardware processors, for example, integrated circuits, one or more software modules, computer-readable media such as memory, firmware, or any combination thereof. In some implementations, user device 702 includes one or more computer-readable medium storing software, which include instructions for execution by the one or more processors for performing the techniques discussed above with respect to FIG. 2, or any other techniques disclosed herein. In some implementations, user device 702 may include a smartphone, tablet computer, desktop computer, laptop computer, personal digital assistant or PDA, portable audio player, portable video player, mobile gaming device, augmented reality device, computer-enhanced glasses or lenses, heads-up display device, head-mounted display device, computerized watch, smart TV, other suitable user device capable of providing content, or any combination thereof.

User device 702 may be coupled to network 710 directly through connection 712, through wireless repeater 716, by any other suitable way of coupling to network 710, or by any combination thereof. User devices 704, 706, and 708 may also be coupled to network 710 directly, through wireless repeater 716, by any other suitable way of coupling to network 710, or by any combination thereof (not shown). Network 710 may include the Internet, a dispersed network of computers and servers, a local network, a public intranet, a private intranet, other coupled computing systems, or any combination thereof.

User device 702 may be coupled to network 710 by wired connection 712. User devices 704, 706, and 708 may also be coupled to network 710 by wired connection 712. Connection 712 may include Ethernet hardware, coaxial cable hardware, DSL hardware, T-1 hardware, fiber optic hardware, analog phone line hardware, any other suitable wired hardware capable of communicating, or any combination thereof. Connection 712 may include transmission techniques including TCP/IP transmission techniques, IEEE 602 transmission techniques, Ethernet transmission techniques, DSL transmission techniques, fiber optic transmission techniques, ITU-T transmission techniques, any other suitable transmission techniques, or any combination thereof.

User device 702 may be wirelessly coupled to network 704 by wireless connection 708. User devices 704, 706, and 708 may also be coupled to network 710 by any suitable wireless connection 708. In some implementations, wireless repeater 716 receives transmitted information from user device 702 by wireless connection 714 and communicates it with network 710 by connection 718. Wireless repeater 716 receives information from network 710 by connection 718 and communicates it with user device 702 by wireless connection 714. In some implementations, wireless connection 714 may include cellular phone transmission techniques, code division multiple access or CDMA transmission techniques, global system for mobile communications or GSM transmission techniques, general packet radio service or GPRS transmission techniques, satellite transmission techniques, infrared transmission techniques, Bluetooth transmission techniques, Wi-Fi transmission techniques, WiMax transmission techniques, any other suitable transmission techniques, or any combination thereof.

Connection 718 may include Ethernet hardware, coaxial cable hardware, DSL hardware, T-1 hardware, fiber optic hardware, analog phone line hardware, wireless hardware, any other suitable hardware capable of communicating, or any combination thereof. Connection 718 may include wired transmission techniques including TCP/IP transmission techniques, IEEE 602 transmission techniques, Ethernet transmission techniques, DSL transmission techniques, fiber optic transmission techniques, ITU-T transmission techniques, any other suitable transmission techniques, or any combination thereof. Connection 718 may include may include wireless transmission techniques including cellular phone transmission techniques, code division multiple access or CDMA transmission techniques, global system for mobile communications or GSM transmission techniques, general packet radio service or GPRS transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 716 may include any number of cellular phone transceivers, network routers, network switches, communication satellites, other devices for communicating information from user device 702 to network 710, or any combination thereof. It will be understood that the arrangement of connection 712, wireless connection 714 and connection 718 is merely illustrative and that system 700 may include any suitable number of any suitable devices coupling user devices 702, 704, 706, and 708 to network 710. It will also be understood that any user device 702, 704, 706, and 708 may be communicatively coupled with any user device, remote server, local server, any other suitable processing equipment, or any combination thereof, and may be coupled using any suitable technique as described above.

In some implementations, any suitable number of remote servers 720, 722, 724 and 726, may be coupled to network 710. Remote servers may be general purpose, specific, or any combination thereof. In some implementations, any suitable number of remote servers 720, 722, 724, and 726 may be elements of a distributed computing network. One or more search engine servers 728 may be coupled to the network 710. In some implementations, search engine server 728 may include the data graph, may include processing equipment configured to access the data graph, may include processing equipment configured to receive search queries related to the data graph, may include any other suitable information or equipment, or any combination thereof. One or more database servers 730 may be coupled to network 710. In some implementations, database server 730 may store the data graph. In some implementations, where there is more than one data graph, the more than one may be included in database server 730, may be distributed across any suitable number of database servers and general purpose servers by any suitable technique, or any combination thereof. It will also be understood that the system may use any suitable number of general purpose, specific purpose, storage, processing, search, any other suitable server, or any combination.

FIG. 8 is a block diagram of a user device of the illustrative computer system of FIG. 7 in accordance with some implementations of the present disclosure. In some implementations, FIG. 8 includes user device 800. In some implementations, user device 800 is an illustrative local and/or remote user device that is part of a distributed computing system. In some implementations, user device 800 corresponds to user device 702 of FIG. 7, a remote server illustrated in system 700 of FIG. 7, any other suitable device corresponding to system 700 of FIG. 7, any other suitable device, or any combination thereof. User device 800 may include input/output equipment 802 and processing equipment 804. Input/output equipment 802 may include display 806, touchscreen 808, button 810, accelerometer 812, global positions system or GPS receiver 836, camera 838, keyboard 840, mouse 842, and audio equipment 834 including speaker 814 and microphone 816. In some implementations, the equipment illustrated in FIG. 8 may be representative of equipment included in a user device such as a smartphone, laptop, desktop, tablet, or other suitable user device. It will be understood that the specific equipment included in the illustrative user device may depend on the type of user device. For example, the Input/output equipment 802 of a desktop computer may include a keyboard 840 and mouse 842 and may omit accelerometer 812 and GPS receiver 836. It will be understood that user device 800 may omit any suitable illustrated elements, and may include equipment not shown such as media drives, data storage, communication devices, display devices, processing equipment, any other suitable equipment, or any combination thereof.

In some implementations, display 806 may include a liquid crystal display, light emitting diode display, organic light emitting diode display, amorphous organic light emitting diode display, plasma display, cathode ray tube display, projector display, any other suitable type of display capable of displaying content, or any combination thereof. Display 806 may be controlled by display controller 818 or by processor 824 in processing equipment 804, by processing equipment internal to display 806, by other controlling equipment, or by any combination thereof. In some implementations, display 806 may display data from a data graph.

Touchscreen 808 may include a sensor capable of sensing pressure input, capacitance input, resistance input, piezoelectric input, optical input, acoustic input, any other suitable input, or any combination thereof. Touchscreen 808 may be capable of receiving touch-based gestures. Received gestures may include information relating to one or more locations on the surface of touchscreen 808, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 808 may be optically transparent and located above or below display 806. Touchscreen 808 may be coupled to and controlled by display controller 818, sensor controller 820, processor 824, any other suitable controller, or any combination thereof. In some implementations, touchscreen 808 may include a virtual keyboard capable of receiving, for example, a search query used to identify data in a data graph.

In some embodiments, a gesture received by touchscreen 808 may cause a corresponding display element to be displayed substantially concurrently, for example, immediately following or with a short delay, by display 806. For example, when the gesture is a movement of a finger or stylus along the surface of touchscreen 808, the system may cause a visible line of any suitable thickness, color, or pattern indicating the path of the gesture to be displayed on display 806. In some implementations, for example, a user device using a mouse, the functions of the touchscreen may be fully or partially replaced using a mouse pointer displayed on the display screen.

Button 810 may be one or more electromechanical push-button mechanism, slide mechanism, switch mechanism, rocker mechanism, toggle mechanism, other suitable mechanism, or any combination thereof. Button 810 may be included in touchscreen 808 as a predefined region of the touchscreen, e.g. soft keys. Button 810 may be included in touchscreen 808 as a region of the touchscreen defined by the system and indicated by display 806. Activation of button 810 may send a signal to sensor controller 820, processor 824, display controller 820, any other suitable processing equipment, or any combination thereof. Activation of button 810 may include receiving from the user a pushing gesture, sliding gesture, touching gesture, pressing gesture, time-based gesture, e.g. based on the duration of a push, any other suitable gesture, or any combination thereof.

Accelerometer 812 may be capable of receiving information about the motion characteristics, acceleration characteristics, orientation characteristics, inclination characteristics and other suitable characteristics, or any combination thereof, of computer 800. Accelerometer 812 may be a mechanical device, microelectromechanical or MEMS device, nanoelectromechanical or NEMS device, solid state device, any other suitable sensing device, or any combination thereof. In some implementations, accelerometer 812 may be a 3-axis piezoelectric microelectromechanical integrated circuit which is configured to sense acceleration, orientation, or other suitable characteristics by sensing a change in the capacitance of an internal structure. Accelerometer 812 may be coupled to touchscreen 808 such that information received by accelerometer 812 with respect to a gesture is used at least in part by processing equipment 804 to interpret the gesture.

Global positioning system or GPS receiver 836 may be capable of receiving signals from global positioning satellites. In some implementations, GPS receiver 836 may receive information from one or more satellites orbiting the earth, the information including time, orbit, and other information related to the satellite. This information may be used to calculate the location of computer 800 on the surface of the earth. GPS receiver 836 may include a barometer, not shown, to improve the accuracy of the location. GPS receiver 836 may receive information from other wired and wireless communication sources regarding the location of computer 800. For example, the identity and location of nearby cellular phone towers may be used in place of, or in addition to, GPS data to determine the location of computer 800.

Camera 838 may include one or more sensors to detect light. In some implementations, camera 838 may receive video images, still images, or both. Camera 838 may include a charged coupled device or CCD sensor, a complementary metal oxide semiconductor or CMOS sensor, a photocell sensor, an IR sensor, any other suitable sensor, or any combination thereof. In some implementations, camera 838 may include a device capable of generating light to illuminate a subject, for example, an LED light. Camera 838 may communicate information captured by the one or more sensor to sensor controller 820, to processor 824, to any other suitable equipment, or any combination thereof. Camera 838 may include lenses, filters, and other suitable optical equipment. It will be understood that computer 800 may include any suitable number of camera 838.

Audio equipment 834 may include sensors and processing equipment for receiving and transmitting information using acoustic or pressure waves. Speaker 814 may include equipment to produce acoustic waves in response to a signal. In some implementations, speaker 814 may include an electroacoustic transducer wherein an electromagnet is coupled to a diaphragm to produce acoustic waves in response to an electrical signal. Microphone 816 may include electroacoustic equipment to convert acoustic signals into electrical signals. In some implementations, a condenser-type microphone may use a diaphragm as a portion of a capacitor such that acoustic waves induce a capacitance change in the device, which may be used as an input signal by computer 800.

Speaker 814 and microphone 816 may be contained within computer 800, may be remote devices coupled to computer 800 by any suitable wired or wireless connection, or any combination thereof.

Speaker 814 and microphone 816 of audio equipment 834 may be coupled to audio controller 822 in processing equipment 804. This controller may send and receive signals from audio equipment 834 and perform pre-processing and filtering steps before transmitting signals related to the input signals to processor 824. Speaker 814 and microphone 816 may be coupled directly to processor 824. Connections from audio equipment 834 to processing equipment 804 may be wired, wireless, other suitable arrangements for communicating information, or any combination thereof.

Processing equipment 804 of computer 800 may include display controller 818, sensor controller 820, audio controller 822, processor 824, memory 826, communication controller 828, and power supply 832.

Processor 824 may include circuitry to interpret signals input to computer 800 from, for example, touchscreen 808 and microphone 816. Processor 824 may include circuitry to control the output to display 806 and speaker 814. Processor 824 may include circuitry to carry out instructions of a computer program. In some implementations, processor 824 may be an integrated electronic circuit based, capable of carrying out the instructions of a computer program and include a plurality of inputs and outputs.

Processor 824 may be coupled to memory 826. Memory 826 may include random access memory or RAM, flash memory, programmable read only memory or PROM, erasable programmable read only memory or EPROM, magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 818, sensor controller 820, and audio controller 822, as have been described above, may be fully or partially implemented as discrete components in computer 800, fully or partially integrated into processor 824, combined in part or in full into combined control units, or any combination thereof.

Communication controller 828 may be coupled to processor 824 of computer 800. In some implementations, communication controller 828 may communicate radio frequency signals using antenna 830. In some implementations, communication controller 828 may communicate signals using a wired connection, not shown. Wired and wireless communications communicated by communication controller 828 may use Ethernet, amplitude modulation, frequency modulation, bitstream, code division multiple access or CDMA, global system for mobile communications or GSM, general packet radio service or GPRS, satellite, infrared, Bluetooth, Wi-Fi, WiMax, any other suitable communication configuration, or any combination thereof. The functions of communication controller 828 may be fully or partially implemented as a discrete component in computer 800, may be fully or partially included in processor 824, or any combination thereof. In some implementations, communication controller 828 may communicate with a network such as network 710 of FIG. 7 and may receive information from a data graph stored, for example, in database 730 of FIG. 7.

Power supply 832 may be coupled to processor 824 and to other components of computer 800. Power supply 832 may include a lithium-polymer battery, lithium-ion battery, NiMH battery, alkaline battery, lead-acid battery, fuel cell, solar panel, thermoelectric generator, any other suitable power source, or any combination thereof. Power supply 832 may include a hard wired connection to an electrical power source, and may include electrical equipment to convert the voltage, frequency, and phase of the electrical power source input to suitable power for user device 800. In some implementations of power supply 832, a wall outlet may provide 120 volts, 60 Hz alternating current or AC. A circuit of transformers, resistors, inductors, capacitors, transistors, and other suitable electronic components included in power supply 832 may convert the 120V alternating current at 60 Hz from a wall outlet power to 5 volts of direct current at 0 Hz. In some implementations of power supply 832, a lithium-ion battery including a lithium metal oxide-based cathode and graphite-based anode may supply 3.7V to the components of computer 800. Power supply 832 may be fully or partially integrated into user device 800, or may function as a stand-alone device. Power supply 832 may power user device 800 directly, may power user device 800 by charging a battery, may provide power by any other suitable way, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A computer-implemented method comprising:
   building an event model by identifying, from user data of one or more applications associated with a user, events related to the user;
   receiving a voice input from the user that includes a command to perform a specific action, the action having a plurality of parameters, and each parameter specifying information necessary to perform the action;
   determining whether the voice input includes sufficient information to perform the action;
   in response to determining that the voice input does not include sufficient information to perform the action, identifying one or more missing parameters from the voice input that are required to perform the action;
   identifying, using the event model, one or more current or future events related to the user that are relevant to the action, wherein each current or future event either is (i) currently occurring relative to a time when the voice input was received or (ii) will occur in the future relative to the time when the voice input was received;
   customizing the action based on the one or more current or future events, comprising assigning values to one or more of the identified missing parameters of the action based on data associated with the one or more current or future events; and
   performing the customized action in response to the voice input.

2. The method of claim 1, the event model further comprising:
   a structured collection of data and relationships associated with the events, wherein the data is indicative of people, places, and times associated with the events.

3. The method of claim 1, further comprising:
   identifying an action to be performed in response to the voice input by:
   determining a context for the voice input that represents a subject of the voice input; and
   determining that the action is associated with the context for the voice input.

4. The method of claim 3, further comprising:
   processing the voice input and the context to determine that there is insufficient information to assign a value to one or more missing parameters of the plurality of parameters based only on the voice input and the context; and
   assigning values to the one or more missing parameters based on data associated with the one or more current or future events.

5. The method of claim 1, wherein:
   identifying, using the event model, one or more current or future events related to the user that are relevant to the action comprises:
   identifying user data from the event model that is potentially relevant to the action;
   determining a level of confidence for an association of one or more potentially relevant current or future events from the identified user data and the context of the voice input; and
   identifying one or more current or future events related to the user that are relevant to the action from the potentially relevant events based on the determined level of confidence.

6. The method of claim 5, further comprising, when the level of confidence is sufficiently low, presenting a refining prompt to allow the user to select one or more possible values for the one or more missing parameters, the one or more possible values being determined based on data associated with the one or more current or future events.

7. The method of claim 6, further comprising, when the level of confidence is sufficiently high, assigning values to the one or more missing parameters based on data associated with the one or more current or future events without presenting the refining prompt.

8. A system comprising one or more computers and one or more storage devices storing instructions that when executed by the one or more computers cause the one or more computers to perform operations comprising:
   building an event model by identifying, from user data of one or more applications associated with a user, events related to the user;
   receiving a voice input from the user that includes a command to perform a specific action, the action having a plurality of parameters, and each parameter specifying information necessary to perform the action;
   determining whether the voice input includes sufficient information to perform the action;
   in response to determining that the voice input does not include sufficient information to perform the action, identifying one or more missing parameters from the voice input required to perform the action;
   identifying, using the event model, one or more current or future events related to the user that are relevant to the action, wherein each current or future event either is (i) currently occurring relative to a time when the voice input was received or (ii) will occur in the future relative to the time when the voice input was received;

customizing the action based on the one or more current or future events, comprising assigning values to one or more of the identified missing parameters of the action based on data associated with the one or more current or future events; and performing the customized action in response to the voice input.

9. The system of claim 8, the event model further comprising:

comprises structured collection of data and relationships associated with current or future events, wherein the data is indicative of people, places, and times associated with the events.

10. The system of claim 8, the operations further comprising:

identifying an action to be performed in response to the voice input by:
 determining a context for the voice input that represents a subject of the voice input; and
 determining that the action is associated with the context for the voice input.

11. The system of claim 10, the operations further comprising:

processing the voice input and the context to determine that there is insufficient information to assign a value to one or more missing parameters of the plurality of parameters based only on the voice input and the context; and assigning values to the one or more missing parameters based on data associated with the one or more current or future events.

12. The system of claim 8, wherein:

identifying, using the event model, one or more current or future events related to the user that are relevant to the action comprises:
 identifying user data from the event model that is potentially relevant to the action;
 determining a level of confidence for an association of the one or more potentially relevant current or future events from the identified user data and the context of the voice input; and
 identifying one or more current or future events related to the user that are relevant to the action from the potentially relevant events based on the determined level of confidence.

13. The system of claim 12, the operations further comprising, when the level of confidence is sufficiently low, presenting a refining prompt to allow the user to select one or more possible values for the one or more missing parameters, the one or more possible values being determined based on data associated with the one or more current or future events.

14. The system of claim 13, the operations further comprising, when the level of confidence is sufficiently high, assigning values to the one or more missing parameters based on data associated with the one or more current or future events without presenting the refining prompt.

15. One or more non-transitory computer storage media encoded with a computer program, the computer program comprising instructions that when executed by one or more computers cause the one or more computers to perform operations comprising:

building an event model by identifying, from user data of one or more applications associated with a user, events related to the user;

receiving a voice input from the user that includes a command to perform a specific action, the action having a plurality of parameters, and each parameter specifying information necessary to perform the action;

determining whether the voice input includes sufficient information to perform the action;

in response to determining that the voice input does not include sufficient information to perform the action, identifying one or more missing parameters from the voice input required to perform the action;

identifying, using the event model, one or more current or future events related to the user that are relevant to the action, wherein each current or future event either is (i) currently occurring relative to a time when the voice input was received or (ii) will occur in the future relative to the time when the voice input was received;

customizing the action based on the one or more current or future events, comprising assigning values to one or more of the identified missing parameters of the action based on data associated with the one or more current or future events; and performing the customized action in response to the voice input.

16. The non-transitory computer storage media of claim 15, the operations further comprising:

identifying an action to be performed in response to the voice input by:
 determining a context for the voice input that represents a subject of the voice input; and
 determining that the action is associated with the context for the voice input.

17. The non-transitory computer storage media of claim 15, the operations further comprising:

processing the voice input and the context to determine that there is insufficient information to assign a value to one or more missing parameters of the plurality of parameters based only on the voice input and the context; and assigning values to the one or more missing parameters based on data associated with the one or more current or near-term events.

18. The non-transitory computer storage media of claim 15, wherein:

identifying, using the event model, one or more current or future events related to the user that are relevant to the action comprises:
 identifying user data from the event model that is potentially relevant to the action;
 determining a level of confidence for an association of the one or more potentially relevant current or future events from the identified user data and the context of the voice input; and
 identifying one or more current or future events related to the user that are relevant to the action from the potentially relevant events based on the determined level of confidence.

19. The non-transitory computer storage media of claim 18, the operations further comprising, when the level of confidence is sufficiently low, presenting a refining prompt to allow the user to select one or more possible values for the one or more missing parameters, the one or more possible values being determined based on data associated with the one or more current or future events.

20. The non-transitory computer storage media of claim 19, the operations further comprising, when the level of confidence is sufficiently high, assigning values to the one or more missing parameters based on data associated with the one or more current or future events without presenting the refining prompt.

* * * * *